(12) United States Patent
Kalampoukas et al.

(10) Patent No.: US 9,628,836 B1
(45) Date of Patent: Apr. 18, 2017

(54) SYSTEM AND METHOD FOR REMOVING ERRONEOUSLY IDENTIFIED TV COMMERCIALS DETECTED USING AUTOMATIC CONTENT RECOGNITION

(71) Applicant: Alphonso Inc., San Carlos, CA (US)

(72) Inventors: Lampros Kalampoukas, Brick, NJ (US); Manish Gupta, Bangalore (IN)

(73) Assignee: Alphonso Inc., San Carlos, CA (US)

( * ) Notice: Subject to any disclaimer, the term of this patent is extended or adjusted under 35 U.S.C. 154(b) by 0 days.

(21) Appl. No.: 15/341,421

(22) Filed: Nov. 2, 2016

(51) Int. Cl.
 *H04N 21/24* (2011.01)
 *H04N 21/81* (2011.01)
 *H04N 21/442* (2011.01)
 *G06F 17/30* (2006.01)

(52) U.S. Cl.
 CPC ..... *H04N 21/2407* (2013.01); *G06F 17/3053* (2013.01); *G06F 17/30117* (2013.01); *G06F 17/30858* (2013.01); *H04N 21/44204* (2013.01); *H04N 21/812* (2013.01)

(58) Field of Classification Search
 CPC ........... H04N 21/812; H04N 21/44008; H04N 21/44204; H04N 21/4722; H04N 21/2668; H04N 21/23424; H04N 21/2407; H04N 21/4331; H04N 21/4394; G06F 17/3053; G06F 17/30858; G06F 17/30117
 See application file for complete search history.

(56) References Cited

U.S. PATENT DOCUMENTS

| 2011/0289114 A1 | 11/2011 | Yu et al. |
| 2013/0071090 A1 | 3/2013 | Berkowitz et al. |
| 2013/0205318 A1 | 8/2013 | Sinha et al. |
| 2014/0282673 A1* | 9/2014 | Neumeier ........ H04N 21/44008 725/19 |

(Continued)

OTHER PUBLICATIONS

Brandon Satterwhite and Oge Marques, "Automatic Detection of TV Commercials." (Satterwhite, B.; Marques, O.; Potentials, IEEE, vol. 23, Issue 2, Apr.-May 2004, pp. 9-12 (4 pages).

(Continued)

*Primary Examiner* — Hai V Tran
(74) *Attorney, Agent, or Firm* — Panitch Schwarze Belisario & Nadel LLP

(57) ABSTRACT

Methods and apparatus are provided for automatically removing erroneously logged commercials from a listing of commercials that are detected in a video data stream by performing automatic content recognition on the video data stream and detecting the identity of each of the commercials played in a commercial break, temporarily logging the identity and start and end time of each detected commercial in a log of played commercials, forming clusters from commercials that overlap in time and have related content, or have significant overlap in time, forming permutations of commercial break timelines from the detected commercials, ranking the timelines based on best fit criteria and selecting the best fit timeline, permanently logging only the commercials in the best fit timeline, and removing the remaining commercials from the temporary log. The remaining logged commercials are presumed to be either erroneously identified commercials or properly identified commercials with erroneous start and end times.

26 Claims, 8 Drawing Sheets

(56) References Cited

U.S. PATENT DOCUMENTS

2015/0100999 A1* 4/2015 McKenna .......... H04N 21/4307
  725/116

OTHER PUBLICATIONS

Wikipedia entry for "Automatic Content Recognition." downloaded from web page: https://en.wikipedia.org/w/index.php?title=Automatic_content_recognition&printable=yes, download date: Aug. 11, 2016, 4 pages.
Audible Magic® product brochures: Core Technology & Services Overview, Broadcast Monitoring, and Media Identification, Audible Magic Corporation, Los Gatos, California, downloaded from web pages at http://www.audiblemagic.com, download date: Aug. 11, 2016, 11 pages.
Gracenote Entourage™, Gracenote, Inc., Emeryville, California, downloaded from webpage: http://www.gracenote.com/video/media-recognition-and-insights/, download date: Aug. 24, 2016, 5 pages.

* cited by examiner

| ID of commercial | Title | length | fingerprint and metadata | Storage location |
|---|---|---|---|---|
| 44667799 | Toyota Camry commercial | 0:29 | | |
| 4466780 | Toyota Camry commercial | 0:58 | | |
| 44667781 | Toyota Camry commercial | 0:60 | | |
| 4466784 | GEICO commercial | 0:14 | | |
| 4466781 | Game of Thrones promo | 0:30 | | |
| | | | | |

Figure 3

| ID of commercial | Title | start date/time | end date/time | channel |
|---|---|---|---|---|
| 44667799 | Toyota Camry commercial | | | NBC |
| 4466780 | Toyota Camry commercial | | | Netflix |
| 44667781 | Toyota Camry commercial | | | CBS |
| 4466784 | GEICO commercial | | | Hulu |
| 4466781 | Game of Thrones promo | | | NBC |
| | | | | |

Figure 4

SYSTEM AND METHOD FOR REMOVING ERRONEOUSLY IDENTIFIED TV COMMERCIALS DETECTED USING AUTOMATIC CONTENT RECOGNITION

BACKGROUND OF THE INVENTION

TV advertising commercials exist in virtually all video data streams, subsidizing some or all of the cost of providing the content to the viewer. The ability to identify where the commercials exist in the video data stream has become an important goal for two main reasons. First, advertisers who pay to place the commercials wish to verify that the commercials were actually played, either by being "aired" during a broadcast, or "streamed" during an internet-based viewing session. The auditing process can be greatly enhanced if commercials can be identified as they are being played so that there can be a recordation to document the airing or streaming. Second, technology built into a video playing device, or executing concurrently with a video playing device, can "skip" commercials, assuming that the location of the commercials can be accurately identified so that no programming is skipped. Some conventional technology for identifying where commercials exist in a video data stream is described in an article entitled "Automatic Detection of TV Commercials" (Satterwhite, B.; Marques, O.; Potentials, IEEE, Volume 23, Issue 2, April-May 2004 pp. 9-12). Satterwhite et al. describes two main categories of methods for detecting commercials, namely, "feature-based detection" and "recognition-based detection." Feature-based detection uses general characteristics of commercials to detect their possible presence. Recognition-based detection works by trying to match commercials with ones that were already learned. Some general characteristics (heuristics) of commercials and commercial breaks include the following:

i. Multiple frames of black are displayed at the beginning and end of each commercial block and between each commercial in the block. There is no audio during these frames.

ii. If a network displays a logo in the corner of the screen, the logo will not appear during the commercials.

iii. Duration is typically some increment of 15 seconds, up to 90 seconds.

iv. Commercials are high in "action," measured by a relatively larger number of cuts per minute between frames compared to a TV show.

v. Commercial breaks tend to occur at the same time in each episode of a given TV series.

Recently, a third reason has arisen to identify where the commercials exist in a video data stream. Mobile devices (e.g., tablets, smartphones) are now in heavy use while viewers watch television (TV). This provides a new platform for synchronized advertising delivery, wherein the TV advertiser may extend their reach to the mobile device. For example, when a particular commercial is airing on, or streaming to, the TV, another commercial may be delivered to the mobile device in either near real-time or in a coordinated delayed time. The mobile ad may be for the same or different product or service as shown in the commercial that was aired on, or streamed to, the TV. To implement such a system, the commercial that was aired on, or streamed to, the TV must be able to be instantly identified.

To facilitate such a system, a database of commercials is maintained so that near real-time matching and identification occurs as a commercial is aired or streamed to a TV, computer, or mobile device. To build such a database, video data streams are analyzed by automated content recognition (ACR) systems. Such systems are well-known in the art.

One type of ACR system uses audio fingerprints within video signals to perform the content recognition. One commercially available audio ACR system is made by Audible Magic Corporation, Los Gatos, Calif. Another commercially available audio ACR system is Gracenote Entourage™ commercially available from Gracenote, Inc., Emeryville, Calif. Other ACR systems are disclosed in U.S. Patent Nos. 2011/0289114 (Yu et al.), 2013/0071090 (Berkowitz et al.), and 2013/0205318 (Sinha et al.), each of which are incorporated by reference herein. Accordingly, the details of the search engine 214 and database 216 of FIG. 2 with respect to the recognition processing are not further described.

As is well-known in the art, search engines associated with ACR systems perform the comparisons on representations of content, such as fingerprints of the content. Thus, in one preferred embodiment, the database 216 maintains content fingerprints of known commercials for comparison with fingerprints of content in the incoming video data stream.

One known technique for performing ACR is to match audio samples from a video data stream against audio files in a database. If the audio sample matches a portion of one of the audio files in the database, the time window of the audio sample in the audio file can be used to calculate the start and end time of the commercial. See, for example, FIG. 1, wherein the ACR found that a four second sample from the video data stream matched a four second audio portion of a one minute (60 second) commercial C1. More specifically, the four second sample S1 matched audio starting at 20 seconds into commercial C1 and ending at 24 seconds into the commercial C1. If the time at the beginning of the sample S1 is $t_1$, then the start time of the commercial (T1) is ($t_1-20$ seconds) and the end time of the commercial (T2) is ($t_1+4$ seconds+36 seconds=$t_1+40$ seconds). Thus, for example, if $t_1$ occurred at 11:00:20 am, the commercial can be presumed to have aired between 11:00:00 (start time) and 11:01:00 am (end time). Since the sampling process occurs continuously, another matching four second sample S2 may start at 40 seconds into the commercial C1 ($t_3$) and end at 44 seconds into the commercial ($t_4$). In fact, there may be many matching samples for a one minute commercial. The air time of the commercial C1 would be exactly the same for S2 as it is for S1. That is, the offset times for the samples that determine when the commercial starts and ends will vary but the actual start and end times will be identical for the two samples. The number of times that samples match a specific commercial and also match the same start and end times can be used to verify the matching process. For example, benchmarks may establish that a 60 second commercial should have a predetermined number of matching samples to be counted as an actual match.

Despite the high accuracy rates and extensive algorithmic techniques used by ACR systems, numerous scenarios may exist that will result in samples matching multiple commercials. Some of these scenarios are as follows:

1. Identical commercials having slightly different time lengths are stored in the database. For example, a version of C1 (e.g., C1') having identical audio and video content may be used that is 58 seconds long vs. 60 seconds for C1. That is, the commercial is exactly the same, but is sped up to fit within a slightly shorter time window. The commercial itself would be visually and audibly indistinguishable to the viewer. Since the commercial has a different overall length, the time offset calculations will result in different start and/or end times. The sampling process will thus identify two candidate commercials (C1 and C1') as matches.

2. Similar commercials having significantly different time lengths are stored in the database. It is common in the industry to produce multiple length commercials for the same ad campaign, such as a 15 second, 30 second and 60 second ad. Portions of each ad may have identical audio and/or video content, such as slogans or tag lines and brand names. Four second samples may thus match multiple commercials in the database. Since the commercials have completely different overall lengths, there will be different start and/or end times for each matching commercial. While the number of times that samples match a specific commercial could potentially be used to determine which ad length is the correctly aired one, there are many instances where this technique will not satisfactorily identify the correctly aired commercial.

3. Different commercials having similar audio and/or visual content are stored in the database. Two completely unrelated brands may use similar audio phrases and/or video content. For example, two completely unrelated brands may license the same song to accompany the commercial, or may coincidentally or deliberately use similar audio content in portions of the commercial.

Another scenario may exist where the samples match the exact same commercial, but the start and end times cannot be accurately identified because the matching content appears in different portions of the commercial. Referring again to FIG. 1, consider an example where the database contains only one commercial that has an audio portion that states "2016 Toyota Camry," but the commercial includes two different audio portions that state "2016 Toyota Camry," one at S1 and another at S2. Upon hearing the first instance of "2016 Toyota Camry" in the aired commercial, the ACR system may not be sure which instance of "2016 Toyota Camry" in the stored commercial is the correct one for matching, and thus may match it to both instances, resulting in two different start and end times for the same exact commercial. While one of the instances is correct, the ACR system is not sure which one is correct, and thus may log them both.

Accordingly, there is a need to automatically detect which matched commercial is likely to be the correctly played one when multiple candidate commercials are identified by the ACR system. The present invention fulfills such a need.

SUMMARY OF THE PRESENT INVENTION

Methods and apparatus are provided for automatically removing erroneously logged commercials from a listing of commercials that are detected in a video data stream by performing automatic content recognition on the video data stream and detecting the identity of each of the commercials played in a commercial break, temporarily logging the identity and start and end time of each detected commercial in a log of played commercials, forming clusters from commercials that overlap in time and have related content, or have significant overlap in time, forming permutations of commercial break timelines from the detected commercials, ranking the timelines based on best fit criteria and selecting the best fit timeline, permanently logging only the commercials in the best fit timeline, and removing the remaining commercials from the temporary log. The remaining logged commercials are presumed to be either erroneously identified commercials or properly identified commercials with erroneous start and end times.

BRIEF DESCRIPTION OF THE DRAWINGS

Preferred embodiments of the present invention will now be described by way of example with reference to the accompanying drawings.

FIGS. 3 and 4 show high level views of selected fields of databases for use in the system of FIG. 2.

DETAILED DESCRIPTION OF THE INVENTION

Certain terminology is used herein for convenience only and is not to be taken as a limitation on the present invention.

The words "a" and "an", as used in the claims and in the corresponding portions of the specification, mean "at least one."

I. DEFINITIONS

Figure 1:
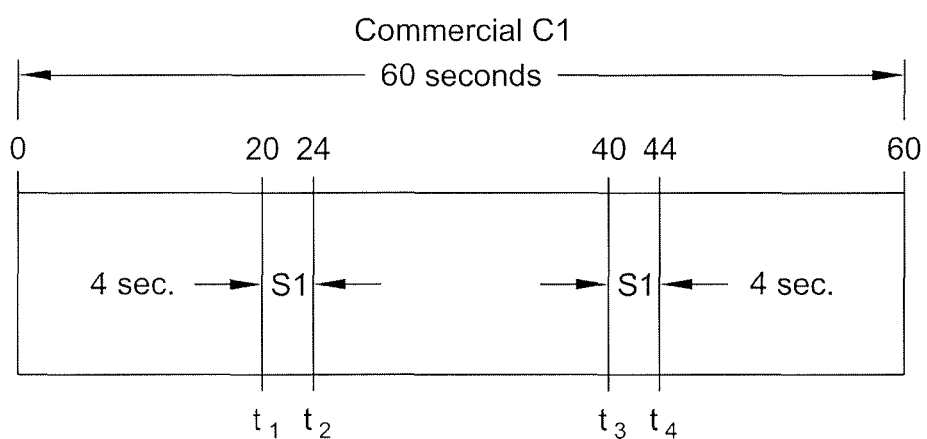
FIG. 1 shows a prior art process for performing ACR by match audio samples from a video data stream against audio files in a database.

The following definitions are provided to promote understanding of the present invention.

video data stream (also, referred to interchangeably as a "TV stream" and a "TV channel stream")—A video data stream includes (i) a conventional broadcast TV signal, typically delivered over a cable or fiber optic network via a set top box, CableCARD® or the like to a TV, (ii) an over-the-air (OTA) broadcast TV signal, and (iii) streaming services that deliver video content to a TV device that is connected to a viewer's home network. A video data stream may also be referred to as a "stream of audiovisual data" or an "audiovisual stream" since a video data stream typically includes audio.

commercial (also, referred to interchangeably as an "advertisement" or "ad")—A "commercial" is an advertisement for a product or service, and also includes advertising for program type content, known in the TV industry as a "promo." A commercial is thus distinguishable from "program type content." An example of "program type content" is a TV show.

commercial break (also, referred to interchangeably as a "block of commercial content," "commercial block," "ad block," or "ad pod")—Each commercial break includes a plurality of successive individual commercials. That is, the commercials are aired back-to-back in a set or group. Commercial breaks are interspersed during a TV program. The total length of the commercial breaks aired during a TV show is almost always significantly shorter than the length of the TV show. Likewise, the length of one commercial break is almost always significantly shorter than the lengths of the TV show segments that precede and follow the commercial break. A typical broadcast TV channel airs about 20 minutes of commercial content per hour. One common format for a commercial break is to show national advertisements first, followed by regional/local advertisements, and concluding with promos.

hit—As used herein, a "hit" is an instance where a sample from the video data stream matches a portion of a previously stored commercial in a database. The sample may be an audio or video sample and may be different lengths. In the example of FIG. 1, the sample is an four second audio sample.

hit count—As used herein, "hit count" is the number of times that samples match the same commercial having the same start time and end time.

II. DETAILED DISCLOSURE

Figure 2:
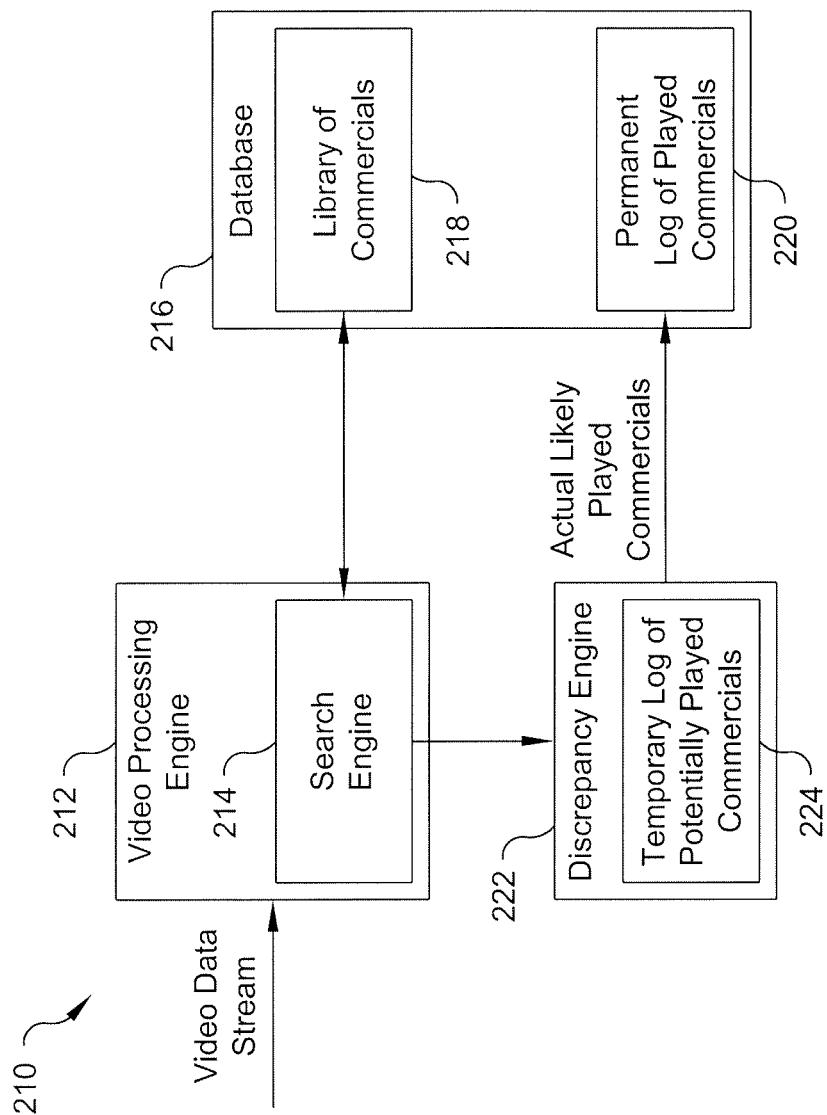
FIG. 2 is a schematic diagram of a system for implementing one preferred embodiment of the present invention.

FIG. 2 shows a schematic diagram of a system 210 for implementing one preferred embodiment of the present invention. A video processing engine 212 receives one or more video data streams, such as one or more TV channel streams. A typical cable network includes hundreds of channels, so in practice there will be hundreds of video streams, one for each channel. However, for simplicity, the preferred embodiment is described in the context of one video data stream. The video processing engine 212 includes a search engine 214 in communication with a database 216 that maintains a library of known commercials 218 and a permanent log of played commercials 220 (also, referred to herein as "a second memory"). The played commercials are commercials that were either aired or streamed. The search engine 214 continuously compares the video data stream to the library of commercials 218 in the database 216 to identify the played commercials. Search engines that perform this type of video recognition are well-known in the art and are incorporated into the ACR systems described above. Thus, the video processing engine 212 and library of commercials 218 would typically be incorporated into an ACR system. The system 210 further includes a discrepancy engine 222 (also, referred to herein as "a computer") that maintains a temporary log of potentially played commercials 224 (also, referred to herein as "a first memory") and determines the actual likely played commercials, and outputs such commercials to the permanent log 220.

FIG. 3 shows a high level view of selected fields of the library of commercials 218 which are used by the search engine 214.

FIG. 4 shows a high level view of selected fields of the permanent log 220 of played commercials, including an identification of the commercial, start and end times, and the channel or service that it was played on. If the commercial was streamed, the service is identified (e.g., Netflix®, Hulu®). The contents of the temporary log 224 (not shown) will include a temporary storage of fields similar to the permanent log 220, as described in more detail below.

FIGS. 5-8 illustrate the process with an example. In the example, commercials and clusters are color-coded as follows to more easily illustrate the process: blue (B); green (G); yellow (Y); and red (R).

Figure 5:
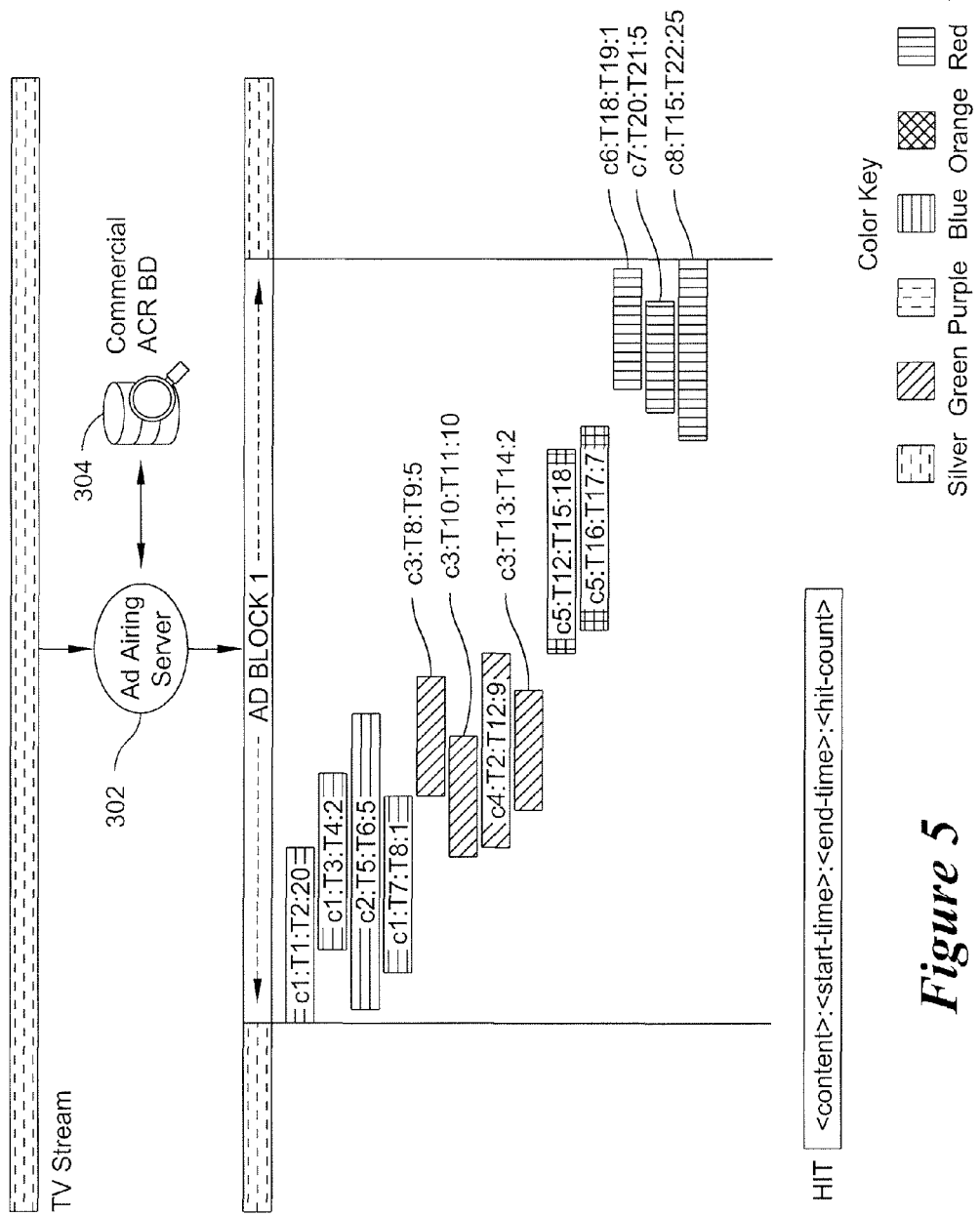
FIGS. 5-8 are schematic diagrams of a process for identifying commercials in an ad block in accordance with one preferred embodiment of the present invention.

FIG. 5 shows a sample ad block within a TV stream, an Ad Airing Server 302 and a commercial ACR database 304. The Ad Airing Server 302 is equivalent to the search engine 214 in FIG. 2, and the commercial ACR database 304 is equivalent to the library of commercials 218 in FIG. 2.

As discussed above, commercials (ads) are typically aired during commercial breaks of a TV show. FIG. 5 shows one such commercial breaks (Ad Block 1). The Ad-Airing Server 302 performs a lookup and finds segments which has hits (or matches) against indices in its commercial ACR-DB 304 (database of indexed commercial contents). For every hit, the Ad Airing Server 302 addresses the following attributes:
1. <content>: which commercial
2. <start-time>: what time the commercial started airing
3. <end-time>: what time the commercial stopped airing
4. <hit-count>: how many times lookup matched this content and airing-time-stamps.

As discussed in the background section above, for many technical reasons, erroneous hits are recorded. In FIG. 5, for example, the Ad-Airing-Server 302 has detected the following ambiguous scenarios (content C1, C2, . . . Cn are commercials):
1. content C1 started airing either at T1, T3, or T7
2. content C2 (which is a variation of C1) possibly was the one which aired instead of C1. Possibly started airing at T2.
3. content C3 started airing at T8, T10 or T13.
4. content C4 (variation of C3) started airing at T2. (Note: one of the C1 airings hits has T2 as its end-time).
5. content C5 had two airing possibilities starting at T12 (when C4 airing had completed) or at T16.
6. content C6, C7, C8 (variations of each other) had single but overlapping airings.

All of the content airing entries are temporarily stored in a memory within the temporary log 224 of potentially played commercials. In this example, the temporary log 224 will include C1-C8.

Figure 6:
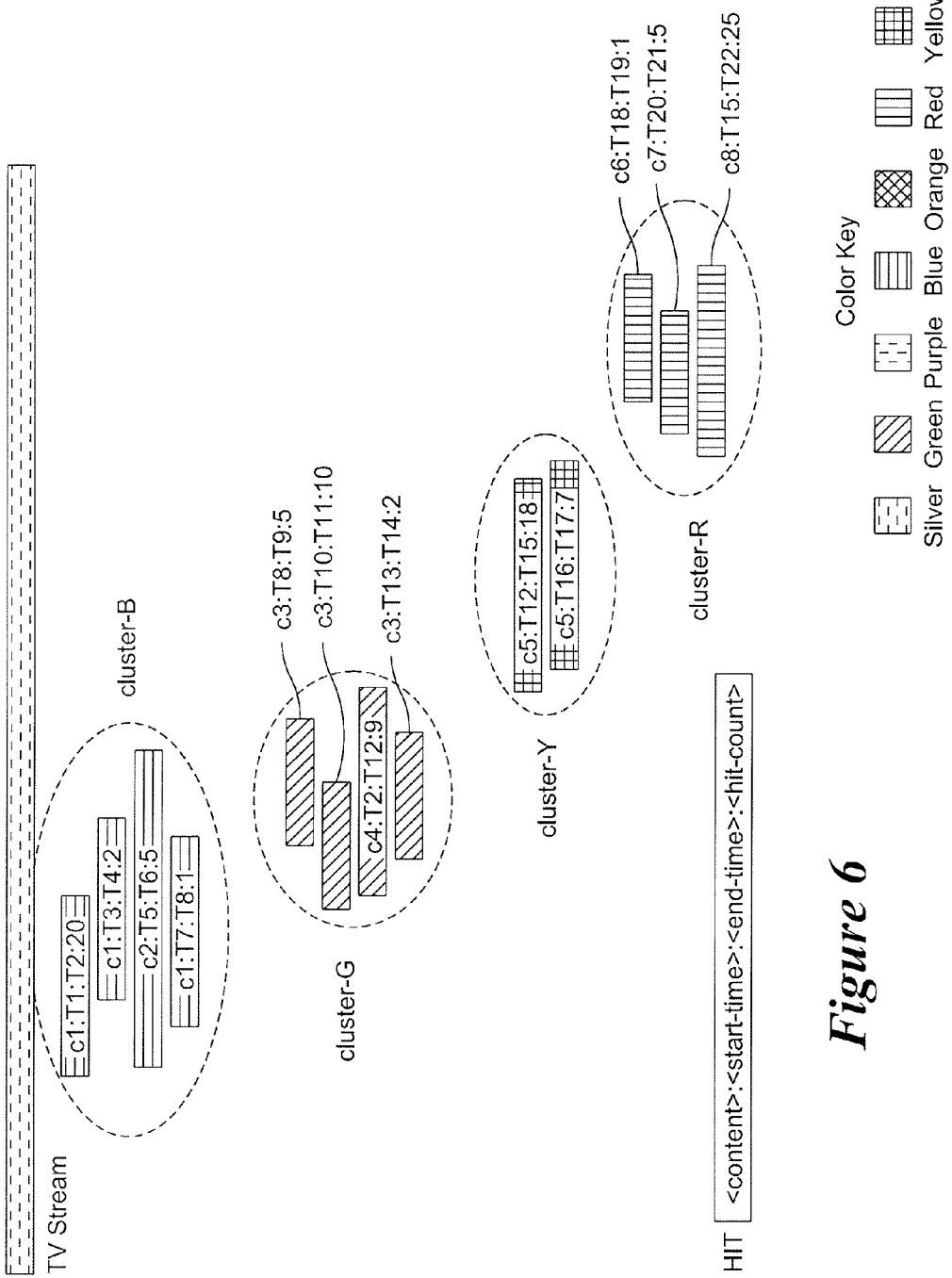

By using a best fitting algorithm, the erroneous hits can be identified and deleted. One preferred embodiment of the algorithm operates as follows:

STEP 1: Cluster similar content (i.e., content that is in close proximity of each other) together. FIG. 6 illustrates that four clusters were defined from a total number of eight identified commercial instances (C1-C8), meaning that four commercials were likely shown during Ad Block 1. Each cluster includes multiple commercials that were matched by the Ad-Airing-Server 302. For each cluster, only one of the commercials represents the likely correct one, meaning the correctly identified commercial having the correctly identified start and end time. As explained above, the commercials in each cluster may represent similar commercials having different lengths, different commercials altogether, or the exact same commercials (including the same length), but having different start and end times. The clusters of FIG. 6 are described as follows:

Cluster B includes all airings for content C1 and C2, captured close to each other.
Cluster G includes all airings for content C3 and C4, which were captured close to each other.
Cluster Y includes all airings for content C5.
Cluster R includes airings for contents C6, C7 and C8, which were captured close to each other.

If the Ad-Airing Server 302 only identifies one potential commercial for time window that coincides with a likely length of a commercial, then the cluster may only have one hit. "One hit" clusters will be common. The example provided in FIGS. 5-8 is intended to illustrate many different scenarios of multiple hit clusters.

Figure 7:
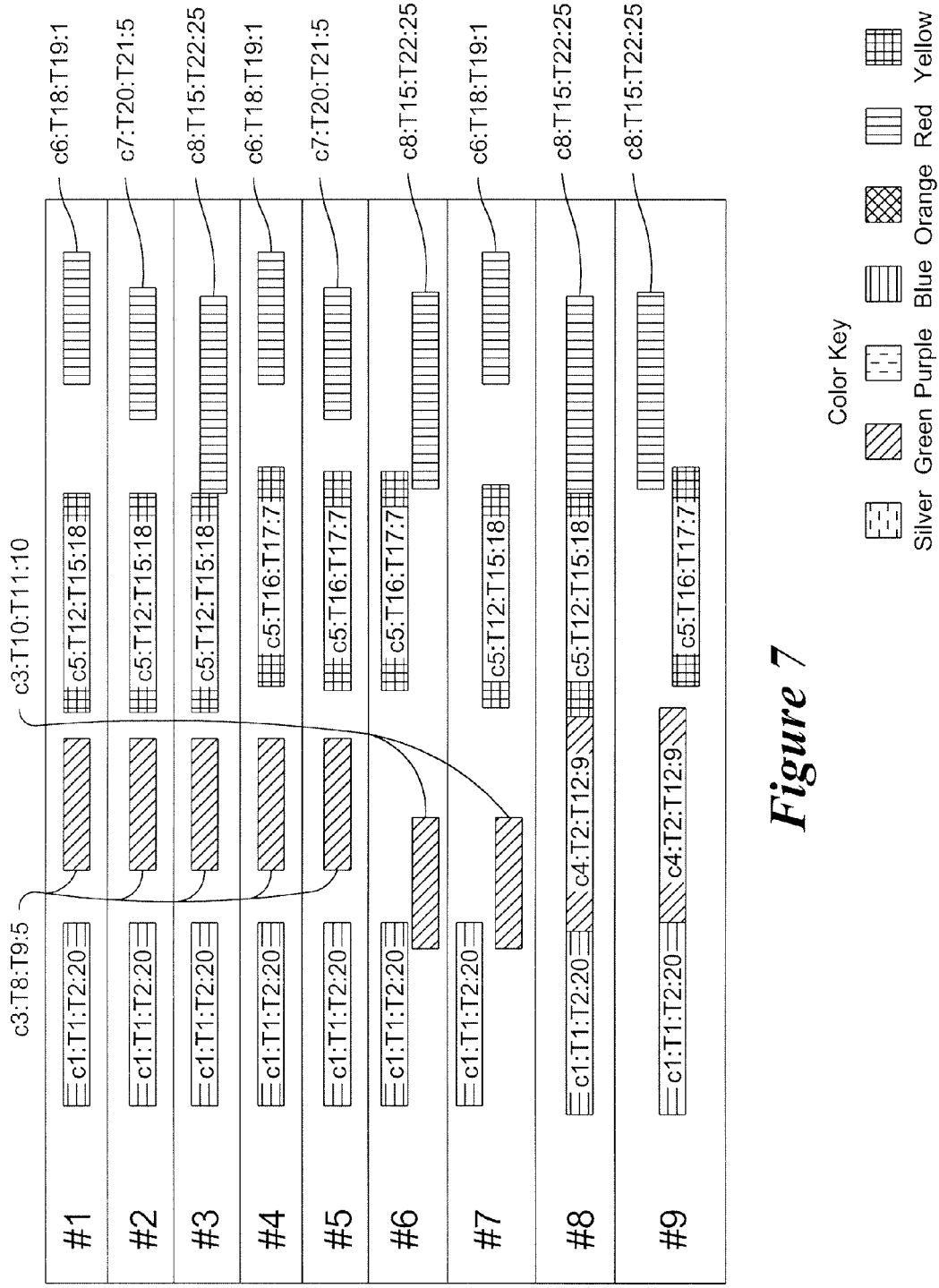

STEP 2: Make all possible combinations (permutations), picking one hit from each cluster for each combination so as to fit the airings on a timeline. FIG. 7 shows a small subset of such combinations.

Figure 8:
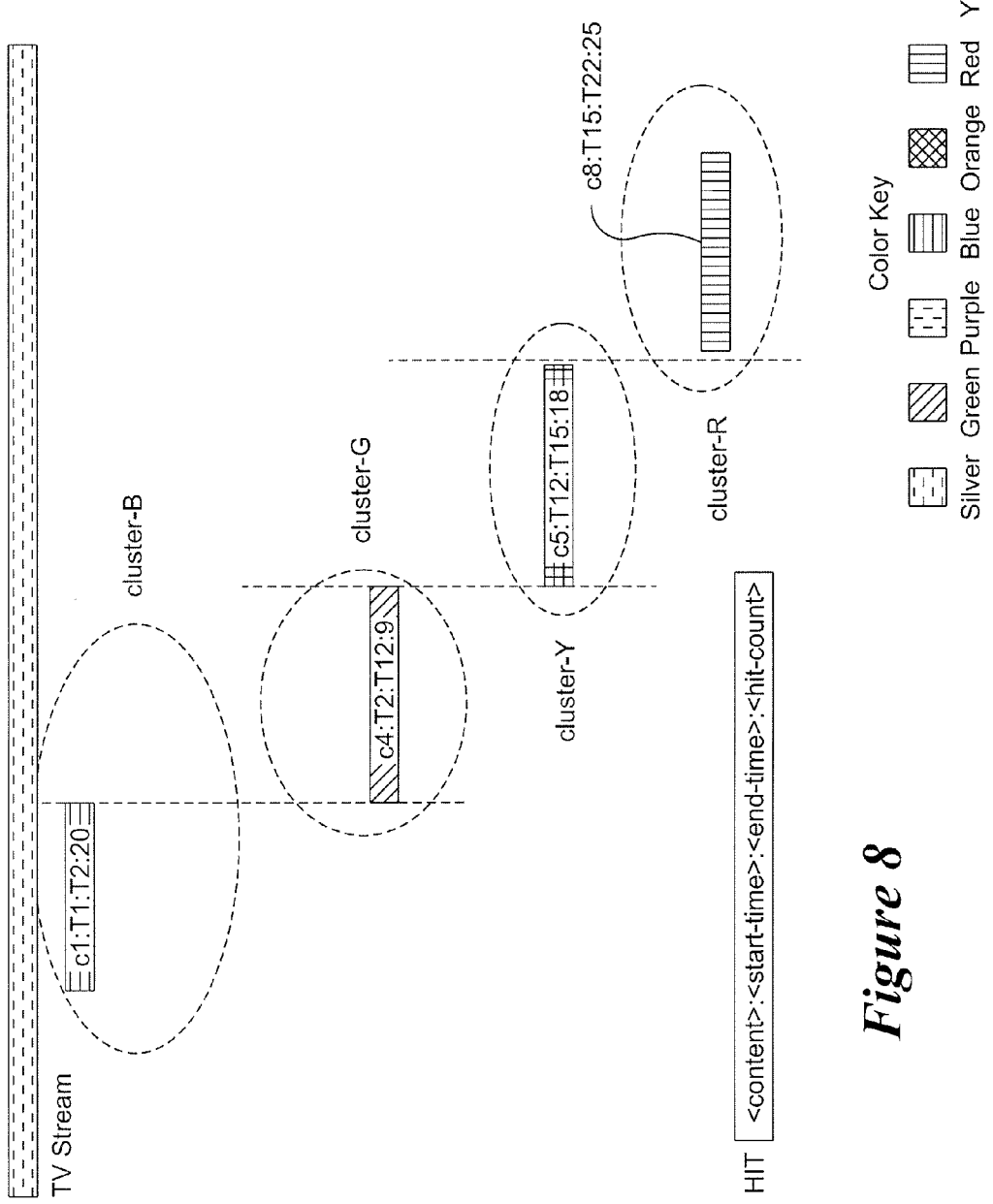

STEP 3: Rank every combination based on how closely or cleanly various airings fit or align with each other to find the desired result. FIG. 8 shows that combination #8 in FIG. 7 was determined to have the highest ranking and includes the first hit from cluster 1, the third hit from cluster 2, the third hit from cluster 3, and the third hit from cluster 4. Properties of a highly ranked combination include (i) minimal or no overlapping of successive commercials, and (ii) a minimum time gap between successive commercials. When multiple candidates fit equally well in a certain cluster, the hit count may be used to narrow down the choice, especially if the hit counts of multiple candidates differ by a large amount.

STEP 4: Delete all remaining hits from the temporary log 224 and send the hits in the combination #8 to the permanent log 220.

Figure 9:
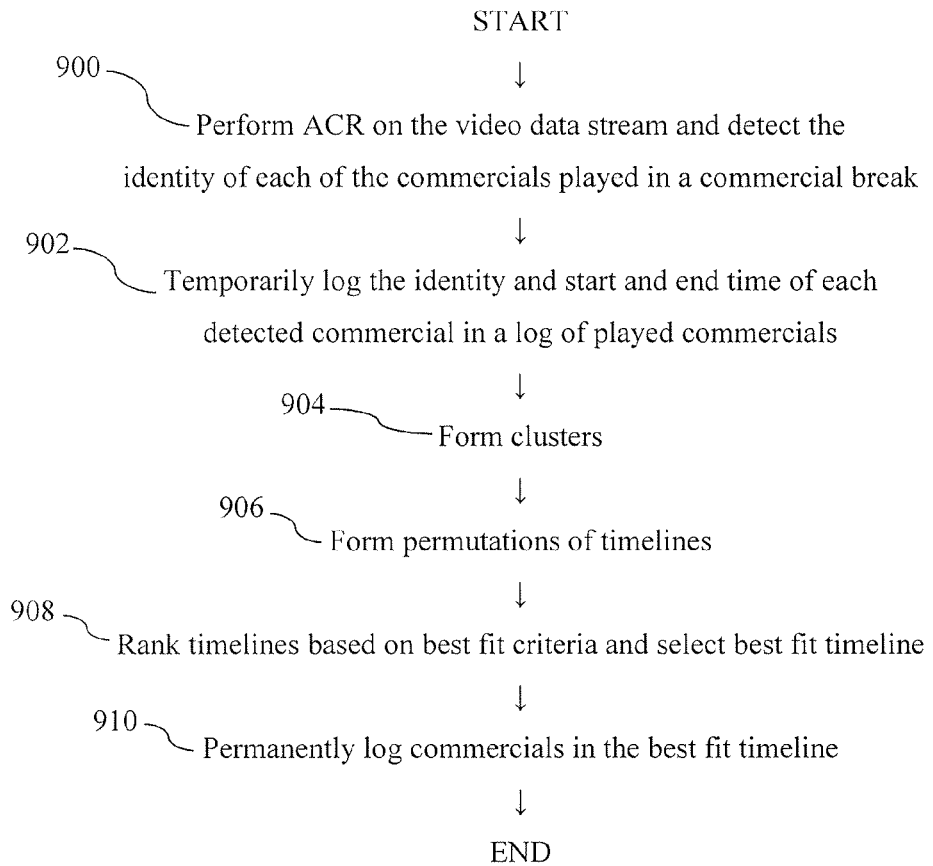
FIG. 9 is a flowchart for implementing one preferred embodiment of the present invention.

FIG. 9 is a flowchart of one preferred embodiment of the present invention implemented by the system 210.

STEP 900: Perform ACR on the video data stream and detect the identity of each of the commercials played in a commercial break.

STEP 902: Temporarily log the identity and start and end time of each detected commercial in a log of played commercials.

STEP 904: Form clusters.

STEP 906: Form permutations of timelines.

STEP 908: Rank timelines based on best fit criteria and select best fit timeline.

STEP 910: Permanently log commercials in the best fit timeline.

III. ADDITIONAL CONSIDERATIONS a. No Hits Located in a Cluster

The presumption for the ranking process is that the library of commercials 218 is sufficiently complete so that there will be at least one hit for each portion of a commercial break. However, if the identity of a commercial cannot be detected, meaning that there are no potential hits for a significant portion of the commercial break, one of the clusters will have no hits. In this scenario, the ranking may be implemented using a "dummy" entry for the cluster with no hits. Based on an analysis of the start and end times of the potential hits for the identified commercials, and the fact that most commercials have known lengths (e.g., 15, 30, 60 seconds), it can generally be extrapolated as to where in the sequence a missing identified commercial belongs in the commercial break and what its length is likely to be. A one hit cluster may then be used to form each of the permutations of commercial sequences. A "dummy" entry may be needed if the ACR system is simply unable to identify a commercial, despite the fact that it is in the library of commercials 218. Any number of technical reasons may cause a recognition failure to occur. A "dummy" entry may also be needed if a new commercial is being played which is not yet in the library of commercials 218. Unless there is a very similar commercial that is already in the library, the ACR system will be unable to identify any commercial at all as being a potential hit.

Alternatively, if the identity of a commercial cannot be detected, the entire process for that Ad Block may be postponed until the commercial that belongs in the missing cluster is identified. That is, if a cluster has no hits, the video processing engine 212 delays the entire process for that Ad Block for a predetermined period of time that coincides with the length of time that it normally takes for unidentified commercials to be identified and logged into the library of commercials 218. If no hits are identified when the process is repeated for that Ad Block, then the "dummy entry" may be used, as described above, since this may indicate a scenario where the ACR system simply cannot recognize the commercial, despite its presence in the library of commercials 218.

b. Cluster Formations

There are many different algorithms that may be used to form the clusters. In one preferred embodiment, a cluster is formed from any identified commercials that have overlapping start and end times, and related content, such as a common company brand (e.g., Toyota). In another embodiment, the identified commercials must have significant overlapping start and end times, but not necessarily any related content.

In an alternative embodiment, certain commercials may be pre-classified to be similar to another commercial by virtue of sharing portions of audio and/or video, but which are not the same commercial in their entirety. For example, as discussed above, it is common in the industry to produce multiple length commercials for the same ad campaign, such as a 15 second, 30 second and 60 second ad. Portions of each ad may have identical audio and/or video content, such as slogans or tag lines and brand names. In this alternative embodiment, a cluster may be augmented with the pre-classified commercial(s) when a commercial similar to one of the pre-classified commercials is detected by the ACR system. In the example above, if the ACR system detected the 30 second ad, the cluster would be automatically populated to include the 15 second and 60 second versions, even though neither of these commercials were matched by the ACR system.

c. ACR System/Ad Airing Server

The embodiments described above use audio ACR system to perform the content recognition. However, it is well-known in the art that ACR systems may use video, as well as combinations of audio and video to perform the content recognition, and the scope of the present invention includes such combinations.

d. Hit Count

As discussed above, when multiple candidates fit equally well in a certain cluster, the hit count may be used to narrow down the choice, especially if the hit counts of multiple candidates differ by a large amount. In some embodiments, the hit count may be used to eliminate potential hits even before they are added to a cluster for subsequent best fit analysis.

e. Timeline Permutations

In the preferred embodiment, all of the timelines are formed (i.e., every possible permutation of commercial blocks from all of the detected commercials are formed), and then ranked. The highest ranking (best fit) timeline is then selected. However, to conserve processing time, in an alternative embodiment, as each timeline is formed from the possible permutations, it is immediately compared to an ideal timeline, and if a particular timeline exactly fits the ideal timeline, no further timelines are formed, and the highest ranking timeline is presumed to be the one that compares to the ideal timeline.

The present invention may be implemented with any combination of hardware and software. If implemented as a computer-implemented apparatus, the present invention is implemented using means for performing all of the steps and functions described above.

When implemented in software, the software code for the video processing engine 212 and its search engine 214 can be executed on any suitable processor or collection of processors, whether provided in a single computer or distributed among multiple computers.

The present invention can also be included in an article of manufacture (e.g., one or more non-transitory, tangible computer program products) having, for instance, computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s) used herein for the video processing engine 212 and its search engine 214 and the discrepancy engine 222 may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

The video processing engine 212, database 216 and discrepancy engine 222 may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags, or other mechanisms that establish relationship between data elements.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. An automated method of removing erroneously logged commercials from a listing of commercials that are detected in a video data stream using automatic content recognition, wherein the commercials are played in commercial blocks, each commercial block including a sequence of individual commercials played in successive time windows, the method comprising:
  (a) performing, using a search engine in communication with a library of commercials, automatic content recognition (ACR) on the video data stream and detecting the identity of each of the commercials played in a commercial block during a commercial break, wherein the ACR evaluates a succession of samples of each of the commercials against a database of files for commercials in the library of commercials, and wherein the ACR further tracks the number of times that the same identified commercial having the same start and end time is recognized;
  (b) temporarily logging, in a first memory, the identity and start and end time of each detected commercial in a log of played commercials and the number of times that the same identified commercial having the same start and end time is recognized;
  (c) clustering together, using a computer, any detected commercials that have (i) overlapping start and end times, and (ii) related content, each cluster representing one of the successive time windows of the commercial block;
  (d) forming, using the computer, a plurality of potential commercial blocks using one commercial from each cluster by making permutations of commercial blocks from the detected commercials, wherein one detected commercial is selected from each cluster for each permutation;
  (e) ranking, using the computer, the potential commercial blocks based on best fit criteria, the best fit criteria of commercials within the potential commercial blocks including (i) minimal or no overlapping of successive commercials, (ii) a minimum time gap between successive commercials, and (iii) the number of times that the same commercial having the same start and end time is recognized; and
  (f) permanently logging, in a second memory, only the commercials in the highest ranking potential commercial block, along with their start and end times in the log of played commercials, and deleting the remaining commercials from the log of played commercials in the first memory, wherein the remaining logged commercials are presumed to be either (i) erroneously identified commercials, or (ii) properly identified commercials with erroneous start and end times.

2. The method of claim 1 wherein a cluster may include only one detected commercial having only one start and end time.

3. The method of claim 1 wherein the video data stream is aired or streamed.

4. The method of claim 1 wherein the related content is a common company brand.

5. The method of claim 1 wherein step (d) includes forming every possible permutation of commercial blocks from all of the detected commercials.

6. The method of claim 1 wherein the ACR is audio ACR and the audio ACR evaluates a succession of audio samples of a commercial against a database of audio files for commercials in the library of commercials.

7. An apparatus for removing erroneously logged commercials from a listing of commercials that are detected in a video data stream using automatic content recognition, wherein the commercials are played in commercial blocks, each commercial block including a sequence of individual commercials played in successive time windows, the apparatus comprising:
(a) a search engine in communication with a library of commercials that performs automatic content recognition (ACR) on the video data stream and detects the identity of each of the commercials played in a commercial block during a commercial break, wherein the ACR evaluates a succession of samples of each of the commercials against a database of files for commercials in the library of commercials, and wherein the ACR further tracks the number of times that the same identified commercial having the same start and end time is recognized;
(b) a first memory in communication with the search engine that temporarily logs the identity and start and end time of each detected commercial in a log of played commercials and the number of times that the same identified commercial having the same start and end time is recognized;
(c) a computer in communication with the first memory configured to:
(i) cluster together any detected commercials that have (i) overlapping start and end times, and (ii) related content, each cluster representing one of the successive time windows of the commercial block,
(ii) form a plurality of potential commercial blocks using one commercial from each cluster by making permutations of commercial blocks from the detected commercials, wherein one detected commercial is selected from each cluster for each permutation, and
(iii) rank the potential commercial blocks based on best fit criteria, the best fit criteria of commercials within the potential commercial blocks including A) minimal or no overlapping of successive commercials, B) a minimum time gap between successive commercials, and C) the number of times that the same commercial having the same start and end time is recognized; and
(d) a second memory in communication with the computer that permanently logs only the commercials in the highest ranking potential commercial block, along with their start and end times in the log of played commercials,
wherein the computer is further configured to:
(iv) delete the remaining commercials from the log of played commercials in the first memory, wherein the remaining logged commercials are presumed to be either (i) erroneously identified commercials, or (ii) properly identified commercials with erroneous start and end times.

8. The apparatus of claim 7 wherein a cluster may include only one detected commercial having only one start and end time.

9. The apparatus of claim 7 wherein the video data stream is aired or streamed.

10. The apparatus of claim 7 wherein the related content is a common company brand.

11. The apparatus of claim 7 wherein forming a plurality of potential commercial blocks includes forming every possible permutation of commercial blocks from all of the detected commercials.

12. The apparatus of claim 7 wherein the ACR is audio ACR and the audio ACR evaluates a succession of audio samples of a commercial against a database of audio files for commercials in the library of commercials.

13. An automated method of removing erroneously logged commercials from a listing of commercials that are detected in a video data stream using automatic content recognition, wherein the commercials are played in commercial blocks, each commercial block including a sequence of individual commercials played in successive time windows, the method comprising:
(a) performing, using a search engine in communication with a library of commercials, automatic content recognition (ACR) on the video data stream and detecting the identity of each of the commercials played in a commercial block during a commercial break, wherein the ACR evaluates a succession of samples of each of the commercials against a database of files for commercials in the library of commercials, and wherein the ACR further tracks the number of times that the same identified commercial having the same start and end time is recognized;
(b) temporarily logging, in a first memory, the identity and start and end time of each detected commercial in a log of played commercials and the number of times that the same identified commercial having the same start and end time is recognized;
(c) clustering together, using a computer, any detected commercials that have significant overlapping start and end times, each cluster representing one of the successive time windows of the commercial block;
(d) forming, using the computer, a plurality of potential commercial blocks using one commercial from each cluster by making permutations of commercial blocks from the detected commercials, wherein one detected commercial is selected from each cluster for each permutation;
(e) ranking, using the computer, the potential commercial blocks based on best fit criteria, the best fit criteria of commercials within the potential commercial blocks including (i) minimal or no overlapping of successive commercials, (ii) a minimum time gap between successive commercials, and (iii) the number of times that the same commercial having the same start and end time is recognized; and
(f) permanently logging, in a second memory, only the commercials in the highest ranking potential commercial block, along with their start and end times in the log of played commercials, and deleting the remaining commercials from the log of played commercials in the first memory, wherein the remaining logged commercials are presumed to be either (i) erroneously identified commercials, or (ii) properly identified commercials with erroneous start and end times.

14. The method of claim 13 wherein a cluster may include only one detected commercial having only one start and end time.

15. The method of claim 13 wherein the video data stream is aired or streamed.

16. The method of claim 13 wherein the related content is a common company brand.

17. The method of claim 13 wherein step (d) includes forming every possible permutation of commercial blocks from all of the detected commercials.

18. The method of claim 13 wherein the detected commercials that are clustered together include commercials that are pre-classified as being similar to a commercial that had its identity detected.

19. The method of claim 13 wherein the ACR is audio ACR and the audio ACR evaluates a succession of audio samples of a commercial against a database of audio files for commercials in the library of commercials.

20. An apparatus for removing erroneously logged commercials from a listing of commercials that are detected in a video data stream using automatic content recognition, wherein the commercials are played in commercial blocks, each commercial block including a sequence of individual commercials played in successive time windows, the apparatus comprising:
  (a) a search engine in communication with a library of commercials that performs automatic content recognition (ACR) on the video data stream and detects the identity of each of the commercials played in a commercial block during a commercial break, wherein the ACR evaluates a succession of samples of each of the commercials against a database of files for commercials in the library of commercials, and wherein the ACR further tracks the number of times that the same identified commercial having the same start and end time is recognized;
  (b) a first memory in communication with the search engine that temporarily logs the identity and start and end time of each detected commercial in a log of played commercials and the number of times that the same identified commercial having the same start and end time is recognized;
  (c) a computer in communication with the first memory configured to:
    (i) cluster together any detected commercials that have significant overlapping start and end times, each cluster representing one of the successive time windows of the commercial block,
    (ii) form, using the computer, a plurality of potential commercial blocks using one commercial from each cluster by making permutations of commercial blocks from the detected commercials, wherein one detected commercial is selected from each cluster for each permutation, and
    (iii) rank the potential commercial blocks based on best fit criteria, the best fit criteria of commercials within the potential commercial blocks including A) minimal or no overlapping of successive commercials, B) a minimum time gap between successive commercials, and C) the number of times that the same commercial having the same start and end time is recognized; and
  (d) a second memory in communication with the computer that permanently logs only the commercials in the highest ranking potential commercial block, along with their start and end times in the log of played commercials,
  wherein the computer is further configured to:
    (iv) delete the remaining commercials from the log of played commercials in the first memory, wherein the remaining logged commercials are presumed to be either A) erroneously identified commercials, or B) properly identified commercials with erroneous start and end times.

21. The apparatus of claim 20 wherein a cluster may include only one detected commercial having only one start and end time.

22. The apparatus of claim 20 wherein the video data stream is aired or streamed.

23. The apparatus of claim 20 wherein the related content is a common company brand.

24. The apparatus of claim 20 wherein forming a plurality of potential commercial blocks includes forming every possible permutation of commercial blocks from all of the detected commercials.

25. The apparatus of claim 20 wherein the detected commercials that are clustered together include commercials that are pre-classified as being similar to a commercial that had its identity detected.

26. The apparatus of claim 20 wherein the ACR is audio ACR and the audio ACR evaluates a succession of audio samples of a commercial against a database of audio files for commercials in the library of commercials.

* * * * *